United States Patent [19]

Wittenberg et al.

[11] 4,153,257
[45] May 8, 1979

[54] RECORD STAMPER PLAYBACK TURNTABLE

[75] Inventors: Roland C. Wittenberg, New Hyde Park; George Alexandrovich, Commack; Frank J. Frielingsdorf, Port Jefferson, all of N.Y.

[73] Assignee: Pickering & Company, Inc., Plainview, N.Y.

[21] Appl. No.: 842,180

[22] Filed: Oct. 11, 1977

[51] Int. Cl.² .............................................. G11B 3/60
[52] U.S. Cl. ................................ 274/39 R; 274/39 A
[58] Field of Search ............................ 274/39 R, 39 A

[56] References Cited

U.S. PATENT DOCUMENTS

| | | | |
|---|---|---|---|
| 3,143,199 | 8/1964 | Gerber | 274/10 R X |
| 3,297,830 | 1/1967 | Baloghy | 274/23 R |
| 4,071,252 | 1/1978 | Gillespie | 274/39 A |

*Primary Examiner*—Charles E. Phillips
*Attorney, Agent, or Firm*—Kane, Dalsimer, Kane, Sullivan and Kurucz

[57] ABSTRACT

A turntable to enable playback of record matrices and stampers is provided. The turntable rotates in the direction opposite that of a conventional turntable and is provided with a tone arm carrying a stylus designed to ride the ridges of the stamper. Magnetic members on the table support surfaces hold the stamper flat to prevent "oil canning". The magnetic poles of the members are oriented radially to minimize the effect of the magnetic members on the turntable transducer. The tracking force of the tone arm is variable by means of a sliding weight.

6 Claims, 2 Drawing Figures

RECORD STAMPER PLAYBACK TURNTABLE

BACKGROUND OF THE INVENTION

The present invention relates to phonograph turntables and in particular to an improved turntable designed for use in the playback of phonograph record matrices and stampers.

During the process of manufacturing phonograph records an important step comprises the formation of a metallic stamper from which the final records are mass produced. The stamper must comprise an exact negative of the record grooves since any imperfection in the stamper will reproduce in the records. The stamper is made from a record "mother" which in turn is obtained through a series of manufacturing procedures from a matrix and in turn a master cut at a recording or "mixdown" session. The stamper is a flat sheet steel member having a nickel plating on its information bearing surface.

Heretofore, it has not been possible to test the accuracy of the information on the stamper directly. To test a stamper an actual record had to be formed from that stamper and then played back on conventional equipment. Any imperfection in the stamper would reflect itself in an imperfection in the sample record. The precise location of the problem on the record sample had to be located and its counterpart on the stamper then had to be found. In many cases the problem on the stamper could be cured by suitably polishing the stamper. After this was done, the stamper then had to be used to produce another sample record which then tested as before and the procedure repeated until perfect records were produced.

It can thus be seen that considerable time and effort could be saved by providing means to enable the direct playback of a phonograph stamper.

In view of the above, it is the principal object of the present invention to provide a phonograph record stamper playback turntable which enables direct playback of the information encoded on the stamper.

A further object is to provide such a turntable which enables playback with a high degree of fidelity and on which corrections in the stamper may be made.

SUMMARY OF THE INVENTION

The above and other beneficial objects and advantages are attained in accordance with the stamper turntable of the present invention. The turntable rotates in the direction opposite that of a conventional turntable and is provided with a tone arm carrying a stylus designed to ride the ridges of the stamper. Magnetic members on the table support surfaces hold the stamper flat to prevent "oil canning". The magnetic poles of the members are oriented radially to minimize the effect of the magnetic members on the turntable transducer. The tracking force of the tone arm is variable by means of a sliding weight.

DETAILED DESCRIPTION OF THE PREFERRED EMBODIMENT

Figure 1:
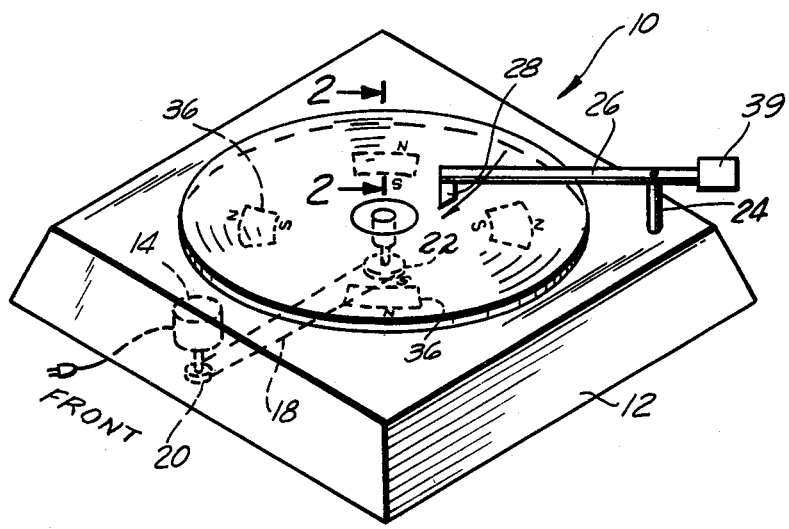
FIG. 1 is a perspective view of a stamper turntable in accordance with the present invention; and, FIG. 2 is a fragmented sectional view taken along reference lines 2—2 of FIG. 1.

Reference is now made to the drawings wherein a preferred embodiment of the stamper playback turntable 10 of the present invention is depicted. The turntable 10 comprises a base 12 containing therein a motor 14. The motor 14 is connected through a suitable drive to a rotatable platform 16. In this preferred embodiment, for reasons to be explained, the drive comprises a flexible rubber belt 18 which connects a pulley 20 on motor 14 to a pulley 22 on the platform. Variously sized pulleys may be provided on either the motor or platform to permit shifting between different speeds (i.e., for 33⅓ r.p.m., 45 r.p.m. and 78 r.p.m.). A tone arm support 24 extends upward from the top of base 12 and pivotally supports one end of a tone arm 26. A pickup cartridge 28 is mounted to the free end of the tone arm. A counterbalancing weight 39 is mounted on the other end of the tone arm. The above described components are virtually identical with the corresponding components of a conventional turntable with the major exceptions being that the motor and drive arrangement are designed to rotate the platform in a counter-clockwise direction as distinct from the clockwise rotation of a conventional turntable. In addition, the tone arm orientation is opposite to that of a conventional turntable. While the cartridge 28 is of a standard construction, the stylus 30 must be of a configuration to permit it to track the information on the sides of the raised ridges 32 of stamper 34. Such styli are disclosed in detail in the commonly assigned U.S. patent applications Ser. No. 790,397 and Ser. No. 790,391. In addition, the drive system should be such to permit ready slippage under manual pressure. That is, without shutting off the motor, the platform may be prevented from rotating in the opposite (i.e., clockwise) direction by hand without injuring the motor or drive.

Figure 2:
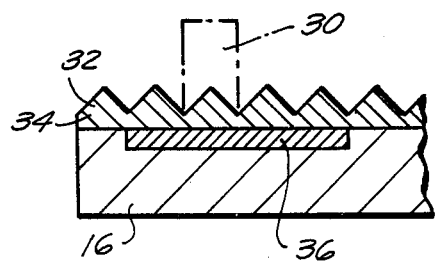

In order to positively track the stamper 34, the stamper must be retained flat on platform 16 while the stylus traverses its ridges. Since the stamper is formed of a sheet metal material, it tends to ripple or bulge in a manner similar to that of the bottom of an oil can. To prevent this "oil canning" effect, magnetic members 36 are provided extending circumferentially about the platform. The members are preferably in the form of flexible strips having a radial pole orientation as shown in FIG. 1. This arrangement minimizes the effect of magnetic members 36 on the magnetic circuit of cartridge 28. The magnetic members 36 may be provided in recesses in the platform 16 as shown in FIG. 2. Alternatively, since such magnetic members are commercially available (from the 3-M Company) in thin strip form with pressure sensitive adhesive they may be applied directly to the surface of the platform.

In use, the turntable cartridge may be connected to a conventional amplifier and speakers to convert the information tracked off a stamper into sound. Any burr or misplating on the stamper will result in a loud "pop" noise. When such a "pop" occurs, the technician can work out the burr by increasing the tracking force on the stylus while oscillating the stamper back and forth over the area of the pop. The diamond stylus can thus be used to wear down or polish out the burr. For this reason, it is desirable to have the platform belt driven as shown in the preferred embodiment. Such belt drives can readily be caused to slip under sufficient manual pressure to provide the necessary back and forth motion.

It is also desirable to have a variable tracking force tone arm. In the preferred embodiment a weight 39 is fitted to slide along arm 26. The weight may be shifted toward the cartridge to increase its tracking force over a range of 1–2 grams necessary for accurate tracking of the stamper to a tracking force of 5–10 grams needed to polish the stamper. A technician may thus listen to the stamper being played back through a speaker system with the weight 38 set to provide a suitable tracking force. If a pop is heard, the technician need merely grasp the platform (thereby causing belt 18 to slip on pulley 22), increase the tracking force of the tone arm by shifting weight 38 toward the cartridge and then manually oscillate the platform about the "pop" until it disappears. When a stamper plays without any pops, the technician knows that perfect records can be stamped from it.

Thus, in accordance with the above, the objectives set forth for this invention are effectively attained.

Having thus described the invention, what is claimed is:

1. A record stamper playback turntable comprising: a base, a stamper platform supported for rotation to said base, a motor and drive system connected to said platform for rotating said platform in a counterclockwise direction, said drive system being such as to slip to permit platform stoppage and reverse rotation under the influence of manual pressure applied to said platform without damaging said platform so that a defect in said stamper may be located and reciprocating movement of said turntable by hand may be used to replay the defective portion a tone arm support extending from said base, a tone arm having one end pivotally attached to said support opposite from a conventional tone arm mounting and a free end, a cartridge affixed to said tone arm free end, a stylus affixed to said cartridge, said stylus having a stamper ridge tracking configuration, said tone arm being mounted to said base so as to permit said stylus to track the ridges of a stamper rotating counterclockwise on said platform and means on said platform for securing a stamper flat against said platform.

2. The invention in accordance with claim 1 wherein said drive system includes pulleys on said motor and platform and a flexible belt extending between said pulleys.

3. The invention in accordance with claim 1 wherein said securing means comprises magnetic strips disposed circumferentially about said platform.

4. The invention in accordance with claim 3 wherein the poles of each of said magnetic strips are oriented radially.

5. The invention in accordance with claim 3 further comprising means affixed to said tone arm for varying the tracking force applied by said tone arm to a stamper on said platform.

6. The invention in accordance with claim 5 wherein said last mentioned means comprises a weight disposed about said tone arm for sliding movement along said tone arm.

* * * * *